Jan. 16, 1934.   U. QUINTAVALLE   1,943,942

FLEXIBLE COUPLING

Filed Jan. 12, 1933

Inventor:-
Umberto Quintavalle
by S. L. Underatts
Atty.

Patented Jan. 16, 1934

1,943,942

UNITED STATES PATENT OFFICE 1,943,942

FLEXIBLE COUPLING

Umberto Quintavalle, Milan, Italy, assignor to Fabbrica Italiana Magneti Marelli Societá Anonima, Milan, Italy Application January 12, 1933, Serial No. 651,431, and in Italy January 20, 1932

4 Claims. (Cl. 64—96)

This invention relates to flexible couplings for aligned shafts and has for its object a flexible coupling ensuring a proper transmission of the drive even when the shafts coupled thereby are not perfectly concentric or aligned, such coupling further providing for a large flexibility in angular direction and for an angular respective adjustment in interengagement of said shafts.

In the coupling of this invention the aligned shafts are coupled by means of at least a flange solid with one of them and having a circular row of radial slots, and a row of tongues provided by a sleeve member connected with the other shaft, each of said sleeve tongues being twisted to lie in a plane radial to the axis of the coupling and to be parallel with such axis in order to be able to flex around a radius of the coupling the free end of the same tongue being engaged in one of said radial slots.

The coupling of this invention admits a large lack in alignment and concentricity of the shafts coupled thereby and it provides for their angular engagement with a flexibility sufficient for practical purposes the degree of such flexibility being able of being altered according to requirements by modifying the thickness of said tongues, their resiliency, the extent of their portion free for flexure, and so on.

On the annexed drawing an embodiment of this invention is shown by way of example, and Figure 1 is a side view of the coupling and associate shafts;

Figure 1:
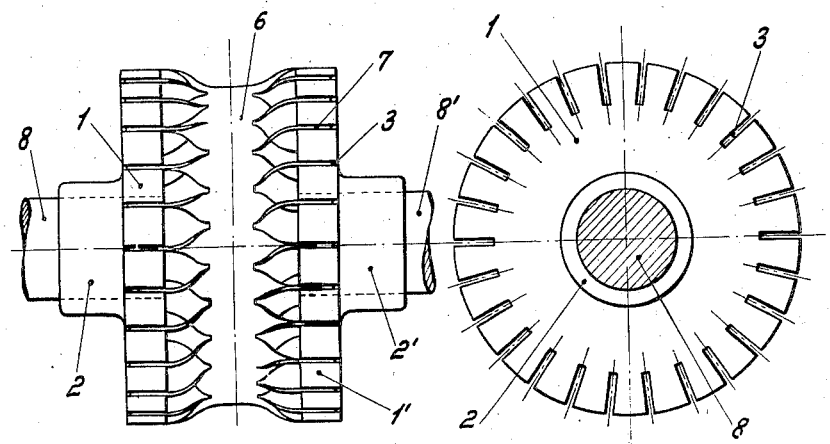
Figure 2:
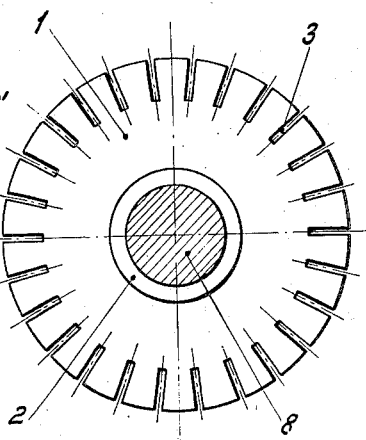
Figure 2 is an end view of a shaft flange.

In the embodiment illustrated by way of example, the coupling comprises two facing flanges 1, 1' each having a hub 2, 2' adapted to be fastened on one of the shafts 8, 8' to be coupled. Each flange 1, 1' has at its periphery a row of radial slots 3 provided at evenly spaced intervals in registering with circles having the same radius in both flanges; said slots 3 have a limited extent in radial direction (Figure 2).

The said flanges 1, 1' are coupled by means of tongues arranged in an annular row and engaged in said radial slots 3 of flanges 1, 1'; each of said tongues lies in a radial plane and extends parallel with the coupling axis thus being able to bend around a line perpendicular to such axis.

Figure 3:
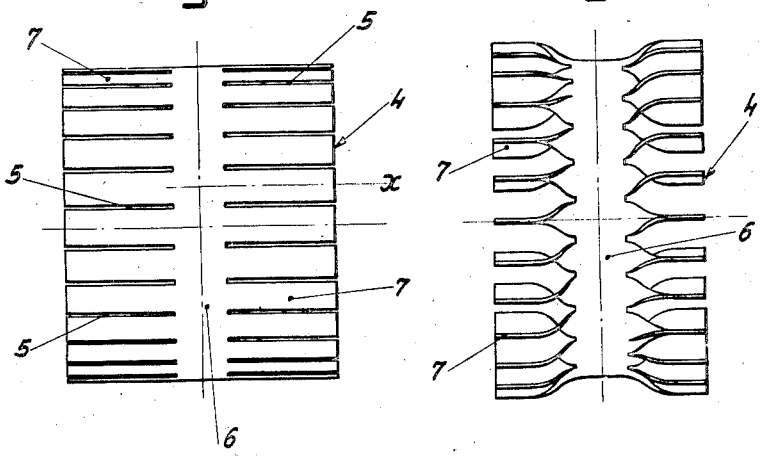
Figure 3 is a side view of an embodiment of the sleeve member before its tongues being carried into their final configuration.

In the illustrated embodiment such tongues are obtained from a cylindrical body 4 made from a metal tube or sheet metal wound in the shape of a cylinder; for such a purpose rows of slots 5 suitably spaced from each other to correspond with the radial extent of slots 3 are provided in the edge of body 4, each of said slots 5 starting from an edge of body 4 and extending over a portion of its axial extent so as to leave an intermediate cylindrical rim 6 (Figure 3).

Figure 4:
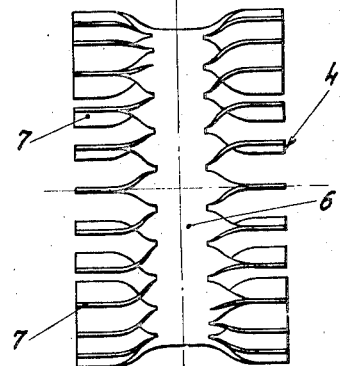
Figure 4 is a similar view of the completed tongue rim in final configuration and ready for mounting.

The strips 7 thus obtained intermediate each two adjacent slots 5 are then twisted through 90° each around its own intermediate line shown by × in Figure 3, and thus the coupling member shown in Figure 4 is obtained, which comprises an intermediate cylindrical rim or drum 6 and edge tongues 7 which extend from said rim in a direction parallel with the axis thereof, such tongues lying in planes radial to rim or drum 4 owing to their having been twisted in the described manner.

For assembling the parts the coupling member 6, 7 is located intermediate flanges 1, 1' and tongues 7 are engaged in slots 3 of said flanges. The member 6, 7 is correctly centered in the coupling owing to the fact that tongues 7 have a radial extent substantially equal to that of cooperating slots 3 of flanges 1, 1'.

Thus the two flanges 1, 1' and shafts 8, 8' fast therewith are interconnected angularly by rim 6 and tongues 7 extending therefrom, while the described engagement of said tongues 7 in slots 3 of the flanges 1, 1' provides for respective displacement of the shaft axes.

The flexibility of the tongues 7 provided in the described manner not only admits for possible lack of concentricity of the coupled shafts, but makes flexible the torsional or angular interconnection of the same and the tangential transmission of the drive; the requisite value may be imparted to such flexibility by properly selecting the material of which the rim 6 and tongues 7 are made, and by suitably proportioning the length of tongues 7 and their cross section.

The angular adjustment of the coupling may be secured by angularly displacing the shafts to be interconnected through one or more of the intervals between subsequent slots 3 of respective flanges 1, 1' before locating the coupling member 6, 7 in position.

Said coupling member may also comprise a single row of flexible tongues as 7 on either of its edges for engagement with one shaft, its rim portion 6 being then connected directly with the other shaft.

The described coupling while complying with all practical requirements has a maximum resistance and lightness and may be produced and assembled in a quite simple manner.

What I claim as my invention and desire to secure by United States Letters Patent is:—

1. A driving coupling for aligned shafts, comprising an end part on each of the opposed ends of said shafts, each of said parts having radial slots, a cylindrical thin metal rim intermediate said parts, tongues integral with and extending from the edges of said rim and twisted to terminate with their respective end portions in radial planes passing through the axis of said rim, the end portions of said tongues of each rim edge being engaged in the radial slots of the said end part of the adjacent shaft.

2. A driving coupling for aligned shafts, comprising an end part on each of the opposed ends of said shafts, each of said parts having slots having a definite depth in a radial direction, a cylindrical thin metal rim intermediate said parts, tongues integral with and extending from the edges of said rim and twisted to terminate with their respective end portions in radial planes passing through the axis of said rim, the end portions of said tongues of each rim edge having a radial extent or width substantially equal to the depth of said radial slots of the end part of one shaft, and being engaged in said radial slots.

3. A driving coupling for aligned shafts, comprising flanges each solid with the facing end of one of the shafts to be coupled, each flange providing radial seats, a cylindrical thin metal rim intermediate said flanges, tongues integral with and extending from the edges of said rim and twisted to terminate with their respective end portions in radial planes passing through the axis of said rim, the end portions of said tongues of each rim-edge being engaged in said radial seats of the facing flange.

4. A driving coupling for aligned shafts, comprising an end part on each of the opposed ends of said shafts, each of said parts having slots having a definite depth in a radial direction, as well as a definite width, a cylindrical thin metal rim intermediate said parts, tongues integral with and extending from the edges of said rim and twisted to terminate with their respective end portions in radial planes passing through the axis of said rim, the end portions of said tongues of each rim edge having a radial extent or width substantially equal to the depth of said radial slots of the end part of one shaft, and a thickness substantially equal to the width of said slots, and being engaged in said radial slots.

UMBERTO QUINTAVALLE.